Nov. 15, 1955  E. K. KARLSSON  2,723,521
ROW DIVIDER FOR CANE HARVESTER
Filed April 13, 1953  2 Sheets-Sheet 1
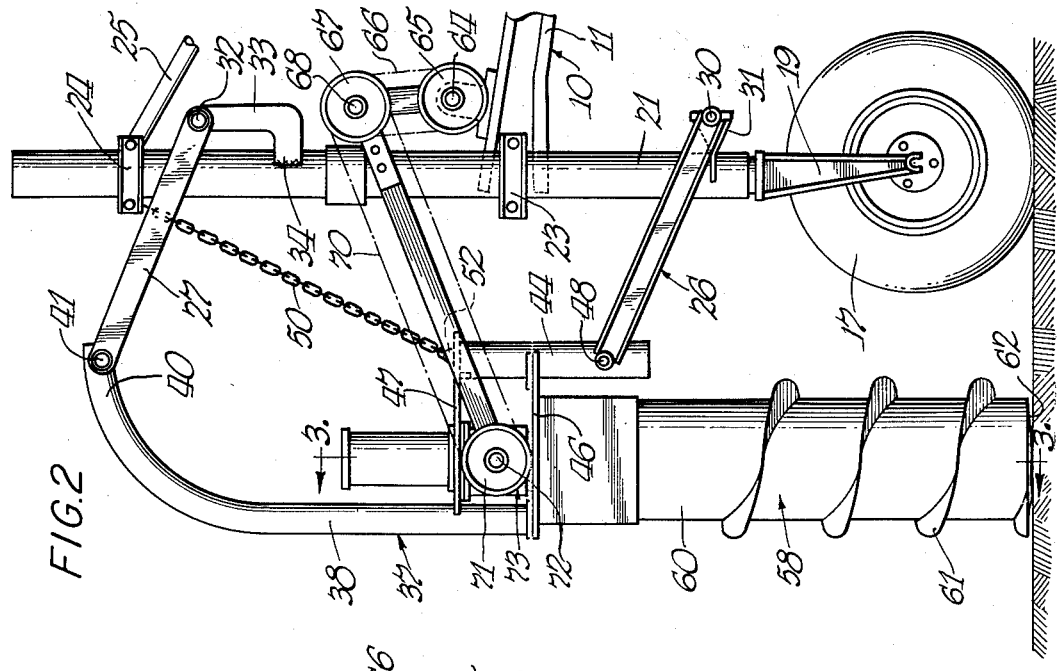
INVENTOR
ELOF K. KARLSSON
Paul O. Pipper
ATTORNEY Nov. 15, 1955  E. K. KARLSSON  2,723,521
ROW DIVIDER FOR CANE HARVESTER
Filed April 13, 1953  2 Sheets-Sheet 2

INVENTOR
ELOF K. KARLSSON
Paul O. Pippel
ATTORNEY

United States Patent Office 2,723,521
Patented Nov. 15, 1955

2,723,521

ROW DIVIDER FOR CANE HARVESTER

Elof K. Karlsson, Moline, Ill., assignor to International Harvester Company, a corporation of New Jersey Application April 13, 1953, Serial No. 348,339

2 Claims. (Cl. 56—119)

This invention relates to a new and improved row divider for cane harvesters.

The harvesting of cane by machines is of relatively recent origin. Even at the present time a large part of all the sugar cane grown in the world is harvested by hand and thus it is possible in hand harvested cane for the individual laborer to pick the cane stalk up regardless of whether it is standing in an upright position or lying on the ground or even intermixed with the adjacent rows of the growing cane. Cane is planted in rows and barring storms and/or permitting the cane to grow too long it would remain in an upright position. Invariably, however, there are storms which cause the stalks to be blown down after which the stalks from adjacent rows are intermixed and twisted with each other making it almost impossible for a machine harvester to pass through a field of cane and accomplish a successful harvesting thereof. Similarly for cane grown in warmer climates than the United States it has been found that the maximum return from cane is obtained after the stalk has grown for a period in excess of a year. This, of course, is almost impossible in the United States as there are occasional freezes which would immediately halt the growth of the cane and result in immediate decay of the sugar content within the cane stalk. In these hotter climate countries the cane thus grows to heights and diameters far in excess of domestic cane. This, of course, results in much of the cane falling down so that it lies on the ground in great tangles, again making it extremely difficult for any mechanical harvesting machine to effect a suitable harvest of the cane.

It is, therefore, a principal object of the present invention to provide means at the forward end of a cane harvesting machine which will cause a defining of the rows of cane and which will simultaneously lift down cane and move it inwardly toward the mechanical harvesting means of the machine.

An important object of this invention is to provide spaced apart vertically disposed auger conveyors positioned at the forward end of a cane harvesting machine for the purpose of dividing rows of growing cane stalks.

Another and further important object of this invention is the provision of vertically disposed spaced apart auger conveyors located at the forward end of a cane harvesting machine having relatively large diameter cores and relatively narrow spiral flight thereon.

Still another important object of this invention is to supply vertically disposed auger conveyor row dividers mounted forwardly of a cane harvesting machine and rotatably driven through a torque responsive device to enable the automatic vertical positioning of the auger conveyors depending upon the ground level over which the cane harvester travels.

Other and further important objects of this invention will become apparent from the disclosures in the following specification and accompanying drawings.

In the drawings:

Fig. 1 is a front elevational view of a cane harvesting machine showing the row divider means of this invention mounted on the front end thereof;

Fig. 2 is a side elevational view of the device as shown in Fig. 1; and

Figure 3:
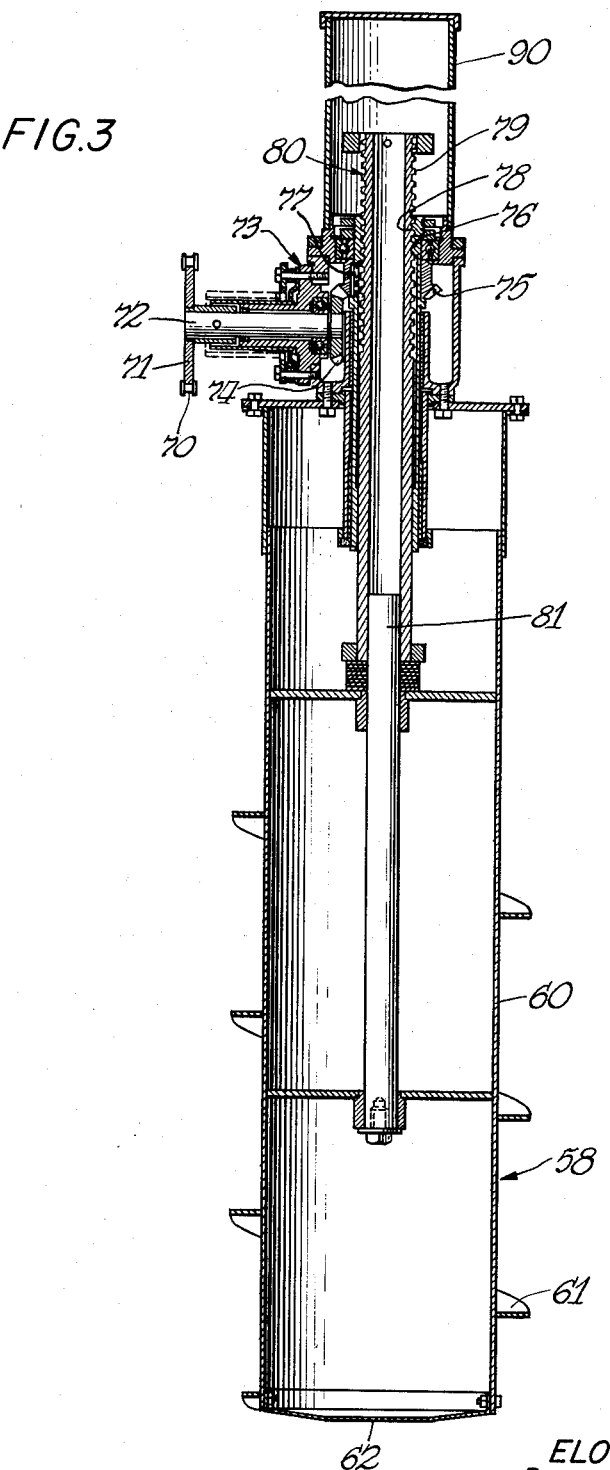
Fig. 3 is an enlarged vertical sectional view taken on the line 3—3 of Fig. 2.

The reference numeral 10 indicates generally a frame supporting structure for the cane harvester of this invention. It should be understood that only the front portion of the harvester has been shown inasmuch as the invention is concerned with a row-dividing mechanism mounted on the front portion of the harvester. The frame supporting structure includes generally, spaced apart longitudinally extending frame members 11 and 12, vertically spaced apart transverse frame members 13 and 14, and horizontally spaced apart vertical frame members 15 and 16. As best shown in Fig. 1 the constituent frame elements are fastened together to make a unitary frame supporting structure which as previously stated is identified by the numeral 10. The frame structure is supported at its forward end by a pair of laterally spaced apart ground engaging wheels 17 and 18. The wheels are carried in fork members 19 and 20 which, in turn, are mounted in vertically disposed cylindrical beam members 21 and 22. The members 21 and 22 are fixedly mounted with respect to the frame structure 10 by means of clamps or the like 23 and 24. A diagonal bracing link or strut 25 extends from the upper cross frame element 14 downwardly and rearwardly to a connection with the rearwardly extending frame elements 11 and 12 at a position not shown.

The cane harvester is adapted to traverse a cane field for the express purpose of cutting and thereafter treating the cut cane and depositing the cane so harvested into a trailing wagon or the like. Much of the cane in fields is considerably tangled and matted down on the ground thus making it extremely difficult to clearly define rows of cane. Many devices have been employed for the purpose of separating rows of cane and making it feasible for a mechanical harvester to operate and these have included the variety of knife elements and separating means in various combinations. As stated above, it is the object of this invention to provide a simple, yet effective, device for separating and cleanly dividing the rows of cane for action thereon by a mechanical harvester. The present invention not only divides the rows of cane but also assists in elevating or straightening those stalks of cane which are bent over on the ground. The harvesting elements of the cane harvester of this invention have not been shown in the drawings inasmuch as they form no part of the present invention. It is sufficent to say that these harvesting elements are generally disposed between and preferably rearwardly of the wheel supporting members 21 and 22.

The row-divider mechanism for this cane harvester is mounted on a parallel linkage extending forwardly from the wheel carrying members 21 and 22. This parallel linkage includes parallel links 26 and 27, and 28 and 29. The links 26 and 27 are disposed in substantially the same vertical plane for the support of one side of the row-defining apparatus and the links 28 and 29 are in a transversely spaced apart vertical plane on the other side of the machine for the proper support of that side of the row-defining apparatus. As best shown in Fig. 2 the link 26 is pivotally mounted at 30 on a lug or bracket member 31 which is fixedly mounted on the vertical beam member 21. Similarly the link 27 is pivotally mounted at 32 on an L-shaped bracket member 33 which is welded or otherwise fastened to the beam 21 at 34. The links 28 and 29 are pivotally mounted at their lower rearward ends at 35 and 36 respectively.

The forward ends of the links 26, 27, 28 and 29 are adapted to carry the row-divider of this invention. The apparatus is provided with a frame structure 37 which includes vertically disposed and laterally spaced apart pipe or rod members 38 and 39 which are bent or curved rearwardly at their upper ends as best shown in Fig. 2 at 40. The rearmost portion of the curved end 40 of the pipe 38 constitutes the carrying member for the hinge mounting of the link 27 as shown at 41. Similarly the rearwardly curved portion of the pipe 39 is designated by the numeral 42 and forms the hinge support at 43 for the upward, forward end of the parallel link element 29. The frame structure 37 additionally includes vertically disposed spaced apart relatively short pipe or rod members 44 and 45. These pipe members 44 and 45 are spaced rearwardly from the pipe members 38 and 39 and are rigidly fastened together by means of the tie plate members 46 and 47. Further, it should be noted that the vertical disposition of the pipe members 44 and 45 is in direct axial alignment with the hinge members 41 and 43 on the upper rearwardly curved portions 40 and 42 of the pipe members 38 and 39. The parallel link elements 26 and 28 have their upper forward ends hingedly attached at 48 and 49 on the lower end portions of the pipe members 44 and 45 respectively. It is thus apparent the hinge points 30, 32, 41 and 48 constitute a true parallelogram and thus provide a basis for the vertical lifting and/or lowering of the row-defining apparatus with respect to the cane harvester frame structure 10. Similarly, the row-defining apparatus is supported on its other side by an identical parallelogram linkage outlined by the hinge points 35, 36, 43 and 49. Chain members 50 and 51 are fastened at their lower ends to the tops of the pipes 44 and 45 as shown at 52 and 53 and thereupon extend upwardly and rearwardly for fixed attachment to the frame supporting structure 10 of the cane harvester at 54 and 55 respectively. The length of the chains 50 and 51 determines the downward extension of the row-defining apparatus of this invention. Thus, if it is desired to raise the apparatus the length of the chains 50 and 51 is shortened. This is accomplished by a simple mechanical arrangement in the form of U-shaped bracket members 56 and 57 at the point of the chain connections 54 and 55 to the frame structure 10. The U openings are of a width permitting insertion of the chain only in a vertical plane, and inasmuch as each link of the chain is disposed at right angles to one another, the chains may be held in these U-shaped brackets 56 and 57 in any desired adjusted position.

The row-defining elements are shown at 58 and 59. These elements include relatively large diameter cylindrical housings as shown in detail in Fig. 3 at 60 and a relatively shallow spiral flight 61 wound on the outer surface thereof from a position adjacent the bottom and upwardly thereon a substantial distance. The elements 58 and 59 are vertically disposed in a position parallel to the wheel supporting beams 21 and 22 and are transversely spaced apart a distance commensurate with the desired customary width of cane rows. Perhaps a further explanation of the growing of cane would be desirable to understand just how these row-dividing elements are geographically located with respect to the rows of cane. Cane grows in relatively large stalks from a root or tuber known as the stool. The stool contains a clump of roots from which a plurality of stalks grow. The cane is planted in rows to permit harvesting either manually or mechanically and the spacing between adjacent rows must be adequate to permit the passage of persons or mechanical contrivances designed to harvest the cane stalks. As previously described many of the cane stalks are down on the ground in a matted condition. The great height to which the cane stalks grow causes them to easily fall in storms and become tangled and intermeshed with cane stalks of adjoining rows and thus it is essential that these stalks be raised to an upright position and separated from the stalks of the adjacent rows to permit the passage of harvesting machines to cut and treat the cane stalks.

The divider elements 58 and 59 as shown in this invention are spaced apart sufficiently so that they may be disposed substantially centrally between adjacent rows of standing cane. The bottoms of these cylindrical members ride directly on the surface of the ground. Such ground running is facilitated by the convexly shaped bottom 62 of the member 58 as shown in Fig. 3. The elements 58 and 59 are adapted to be rotated inwardly toward each other so that the shallow spiral plate 61 of the element 58 and a comparable spiral plate 63 of the element 59 urge the stalks to a position between the elements and further tend to raise or screw the down stalks lying in the path of these spaced apart row-defining elements upwardly. The elements 58 and 59 have their downward extension limited only by the chain elements 50 and 51 and hence they are not prohibited from rising vertically if there is some tendency to cause the elements to rise such as, for example, irregular ground contour.

The rotational drive of the row-defining elements 58 and 59 is received from a source of rotary motion on the cane harvester proper. This is shown as a rotating shaft 64 which receives its drive from power elements (not shown) on the cane harvester. A sprocket 65 is fastened to the shaft 64 and by means of a chain 66 drive is delivered from the shaft 64 to the sprocket 67 which in turn is fastened to a transversely disposed shaft 68. The shaft 68 carries a second sprocket 69 spaced inwardly from the sprocket 67 and by means of a chain 70 the drive from the shaft 68 is delivered downwardly and forwardly to a sprocket 71 carried on a shaft 72. As best shown in Fig. 3 the shaft 72 is journally mounted within a gear box 73 on the upper end of the row-defining element 58. As best shown in Fig. 3 the inner end of the shaft 72 carries a vertically disposed beveled gear 74 which meshes with a horizontally disposed beveled gear 75 keyed to a vertically disposed sleeve or nut member 76 as shown at 77. The member 76 is provided with internal thread members 78 which are adapted for threaded engagement with the external threads 79 of a sleeve member 80. The lower end of the sleeve 80 is slidably mounted over a rod member 81 fixed to the cylindrical housing 60. Thus rotation of the beveled gear 75 causes a concurrent rotation of the row-defining element 58 through the medium of the engaged thread elements 78 and 79. The rotating element 59 is driven in the same manner from and through chain and sprocket elements corresponding to the chain drive described for the row-defining element 58. These are a sprocket 82 mounted on the driving shaft 64, a chain 83 and sprocket 84 mounted on the cross shaft 68, an inwardly spaced sprocket 85, a chain 86 and finally a sprocket 87 mounted on a shaft 88 supported within a gear housing 89 comparable to the gear housing 73 as shown for the element 58.

In operation, the device of this invention passes through a field of standing cane with the elements 58 and 59 rotating inwardly toward each other for the dual purpose of moving cane stalks laterally inwardly to a path between the row-defining elements and simultaneously picking up down cane and holding it in a substantially vertical position for subsequent treatment by cane harvester elements carried rearwardly on this same machine. The driving arrangement for the row-defining elements 58 and 59 is such that it responds to the torque load imposed on these rotating elements in their resistance to rotation and directly causes a raising or lowering of the elements to balance that torque load. In the event the divider elements should strike some rigid obstruction such as a rock or a stump they start a rising movement and this is accomplished by the drive of the elements through the medium of the cooperative threads 78 and 79 which automatically converts rotational movement of the elements into vertical movement of the elements merely by the climbing of one of the threads upon the other thread. This climbing movement continues until the torque required to rotate the elements has returned to normal whereafter the rotational movement of the elements will continue and the units will remain in their newly-found vertical level until such time as the torque load reduces sufficiently for the elements to drop and again seek their desired level as occasioned by the torque load on the screw thread drive. In order that the relative rotational movement of the threaded drive elements may be enclosed a cap or cover 90 is provided thereover.

It thus appears that the device of this invention constitutes a row-defining apparatus for cane harvesters which effectively separates cane from adjacent rows and elevates down cane and continues this function uninterruptedly despite various ground contours and/or obstructions which may be found in cane fields.

Numerous details of construction may be varied throughout a wide range without departing from the principles disclosed herein and I, therefore, do not propose limiting the patent granted hereon otherwise than as necessitated by the appended claims.

What is claimed is:

1. A row divider for stalk crops comprising a wheeled supporting structure, a pair of laterally substantially spaced apart vertically disposed rotating cylindrical elements, means mounting said cylindrical elements on said wheeled supporting structure forwardly of one end thereof, and spiral flight affixed to the outer surface of each of said rotating cylindrical elements from a position adjacent the bottom upwardly a substantial distance, said means mounting said cylindrical elements on said wheeled supporting structure including a parallel linkage whereby the cylindrical elements are permitted generally vertical movement with respect to said wheeled supporting structure, and means responsive to torque load on the rotating cylindrical elements for automatically varying the height of said rotating cylindrical elements.

2. A row divider for stalk crops comprising a wheeled supporting structure, a pair of laterally substantially spaced apart vertically disposed rotating cylindrical elements, means mounting said cylindrical elements on said wheeled supporting structure forwardly of one end thereof, and spiral flight affixed to the outer surface of each of said rotating cylindrical elements from a position adjacent the bottom upwardly a substantial distance, driving means provided for rotating said cylindrical elements, and said driving means including cooperative threaded members within said cylindrical elements, and said cooperative threaded members through all normal operations of the device transmit rotary and/or vertical movement in direct response to the torque load resisting rotation of said cylindrical elements.

References Cited in the file of this patent

UNITED STATES PATENTS

| | | |
|---|---|---|
| 1,477,598 | Sears | Dec. 18, 1923 |
| 1,701,423 | Sauveur | Feb. 5, 1929 |
| 1,748,746 | Zuckerman | Feb. 25, 1930 |
| 2,210,219 | Sievers et al. | Aug. 6, 1940 |
| 2,434,104 | Esseling | Jan. 6, 1948 |
| 2,477,794 | Gehl | Aug. 2, 1949 |
| 2,571,224 | Edwards | Oct. 16, 1951 |